United States Patent
Vion et al.

(10) Patent No.: US 10,494,086 B2
(45) Date of Patent: Dec. 3, 2019

(54) TURBOMACHINE WITH MULTI-DIAMETER PROPELLER

(71) Applicant: Safran Aircraft Engines, Paris (FR)

(72) Inventors: Laurence Francine Vion, Moissy-Cramayel (FR); Mathieu Simon Paul Gruber, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 260 days.

(21) Appl. No.: 15/535,773

(22) PCT Filed: Dec. 17, 2015

(86) PCT No.: PCT/FR2015/053600
§ 371 (c)(1),
(2) Date: Jun. 14, 2017

(87) PCT Pub. No.: WO2016/097635
PCT Pub. Date: Jun. 23, 2016

(65) Prior Publication Data
US 2017/0369153 A1    Dec. 28, 2017

(30) Foreign Application Priority Data
Dec. 17, 2014  (FR) ..................................... 14 62652

(51) Int. Cl.
*B64C 11/48*    (2006.01)
*B64C 11/18*    (2006.01)
(Continued)

(52) U.S. Cl.
CPC .............. *B64C 11/48* (2013.01); *B64C 11/18* (2013.01); *F01D 7/00* (2013.01); *B64C 11/306* (2013.01)

(58) Field of Classification Search
CPC ....... B64C 11/48; B64C 11/18; B64C 11/306; F01D 7/00; Y02T 50/66; F04D 29/327;
(Continued)

(56) References Cited

U.S. PATENT DOCUMENTS

| | | | | |
|---|---|---|---|---|
| 921,423 | A | * | 5/1909 | Maokaness ............. B64C 11/48 416/200 R |
| 1,021,822 | A | * | 4/1912 | Broussouse .............. B63H 1/14 416/200 R |

(Continued)

FOREIGN PATENT DOCUMENTS

| | | | | |
|---|---|---|---|---|
| DE | 3716326 | A1 | * 12/1988 | ............. B64C 11/00 |
| EP | 0 364 689 | A1 | 4/1990 | |

(Continued)

OTHER PUBLICATIONS

French Preliminary Search Report dated Oct. 22, 2015 in Patent Application No. FR 1462652 (with English translation of categories of cited documents).

(Continued)

*Primary Examiner* — J. Todd Newton
(74) *Attorney, Agent, or Firm* — Oblon, McClelland, Maier & Neustadt, L.L.P.

(57) ABSTRACT

A turbomachine including at least two unducted propellers, one of which is an upstream propeller and one a downstream propeller, the upstream propeller including a plurality of blades, at least one first blade of which has a different length from that of a second blade.

16 Claims, 4 Drawing Sheets

(51) Int. Cl.
*F01D 7/00* (2006.01)
*B64C 11/30* (2006.01)

(58) Field of Classification Search
CPC ...... F04D 29/666; F03D 1/0633; F03D 1/065; F03D 1/0675; Y02E 10/721
USPC .............................................. 416/203, 201 R
See application file for complete search history.

(56) References Cited

U.S. PATENT DOCUMENTS

| | | | | |
|---|---|---|---|---|
| 1,717,663 A | * | 6/1929 | Checkley | B63H 23/34 416/200 R |
| 1,913,590 A | * | 6/1933 | Ftacek | B64C 11/48 416/175 |
| 1,946,571 A | * | 2/1934 | Briner | B64C 11/36 416/94 |
| 2,222,444 A | * | 11/1940 | Schmidt | B64C 11/16 416/203 |
| 4,767,269 A | * | 8/1988 | Brandt | B63H 5/10 415/143 |
| 4,883,240 A | * | 11/1989 | Adamson | B64C 11/00 244/69 |
| 4,901,920 A | * | 2/1990 | Wollin | F04D 29/327 239/14.2 |
| 4,930,984 A | | 6/1990 | Kesel et al. | |
| 5,482,436 A | * | 1/1996 | Bohanon, Sr. | F04D 29/325 416/200 R |
| 5,620,303 A | * | 4/1997 | Moffitt | B64C 11/003 415/119 |
| 5,735,670 A | * | 4/1998 | Moffitt | B64C 11/003 244/1 N |
| 5,743,489 A | * | 4/1998 | Stemme | B64C 11/28 244/59 |
| 8,382,430 B2 | * | 2/2013 | Parry | B64C 11/48 416/1 |
| 2010/0206982 A1 | | 8/2010 | Moore et al. | |
| 2011/0150645 A1 | * | 6/2011 | Moore | B64C 11/003 416/1 |
| 2012/0025016 A1 | * | 2/2012 | Methven | B64C 11/00 244/1 N |
| 2013/0115083 A1 | | 5/2013 | Vuillemin | |
| 2014/0353420 A1 | * | 12/2014 | Prud'Homme-Lacroix | B64D 31/00 244/6 |
| 2015/0147181 A1 | * | 5/2015 | Henze | B64C 11/18 416/215 |
| 2015/0344127 A1 | * | 12/2015 | Wood | B64C 11/18 60/805 |
| 2016/0169198 A1 | * | 6/2016 | Hotto | F03D 1/0608 416/42 |
| 2017/0369153 A1 | * | 12/2017 | Vion | B64C 11/18 |
| 2018/0186448 A1 | * | 7/2018 | Pantalone | B64C 27/467 |
| 2019/0107123 A1 | * | 4/2019 | Veitch | F01D 5/141 |

FOREIGN PATENT DOCUMENTS

| | | |
|---|---|---|
| FR | 2 980 818 A1 | 4/2013 |
| FR | 2 999 151 A1 | 6/2014 |
| WO | WO 2012/010782 A1 | 1/2012 |

OTHER PUBLICATIONS

International Search Report dated Apr. 20, 2016 in PCT/FR2015/053600 (with English translation).

* cited by examiner

TURBOMACHINE WITH MULTI-DIAMETER PROPELLER

GENERAL TECHNICAL FIELD

The present invention relates to turbomachines of the type having a contra-rotating open rotor.

PRIOR ART

"Unducted" fan type engines (or turboprops of the "Propfan" or "Open rotor" type) are a type of turbomachine wherein the fan is attached outside the engine casing, in contrast to conventional turbine engines (of the "turbofan" type) wherein the fan is ducted.

Known in particular is the "Contra-Rotating Open Rotor" (CROR), shown in FIG. 1, which is equipped with two propellers rotating in opposite directions. It is of great interest due to its particularly high propulsive efficiency.

The goal of this type of engine is thus to retain the speed and the performance of a turbojet while having a fuel consumption similar to that of a turboprop. Indeed, the fact that the fan is not ducted makes it possible to increase the diameter and the air flow usable for thrust.

However, the absence of a duct creates problems, particularly acoustic problems, in certification. In fact, the noise generated by open rotor propellers propagates in a free field. Moreover, noise sources are very numerous in this type of architecture. Regarding acoustic certification points, it is known that the principal source of noise comes from vortex structures leaving the blades of the upstream propeller and striking the blades of the downstream propeller. Current standards impose a maximum noise threshold in near-ground zones, that is during takeoff and approach. These standards are increasingly constraining as time passes and it is important to anticipate this increasing severity, so that the engines achieve them on the day of their entry into service.

Two different approaches exist for reducing this interaction noise:
  "clipping": the downstream propeller is of smaller diameter than the upstream propeller so that the tip vortices emitted by the latter pass over the first, so as to avoid noise-generating impact. This option, however, requires re-designing the blades of the downstream propeller by lengthening chords so as to ensure sufficient thrust. Moreover, clipping does not allow the impacts of vortex structures to be avoided when the airplane is operating at an angle of attack;
  modifying the geometry of the blades of the upstream propeller so as to reduce the intensity of the vortex structures emitted by the upstream propeller, and their distribution in the wake. This allows unsteady load fluctuations on the downstream propeller to have a smaller amplitude. Cited for example are patent applications FR2980818 and FR2999151. This option, however, turns out to be complex and requires reducing the load on the upstream propeller and its thrust.

It would therefore be desirable to find a simple and effective unducted propeller architecture which is free of the foregoing limitations, and allows a substantial and constant improvement (even at large angles of attack) of the aero-acoustic performance of the engine without loss of thrust.

PRESENTATION OF THE INVENTION

The present invention proposes, according to a first aspect, a turbomachine comprising at least two unducted propellers including one upstream propeller and one downstream propeller, the upstream propeller comprising a plurality of blades at least one first blade of which has a different length from at least one second blade.

According to other advantageous and non-limiting features:
  two consecutive blades of the upstream propeller have different lengths;
  the blades of the upstream propeller are divided into $n \in [\![2; +\infty[$ groups of blades of equal length, including at least one group of first blades and at least one group of second blades;
  all the groups of blades have different blade lengths;
  all the groups of blades have the same number of blades;
  the blades are positioned around the upstream propeller so that each sub-assembly of n consecutive blades comprises one blade from each group;
  the upstream propeller comprises $2kn, k \in \mathbb{N}^*$, blades, two diametrically opposed blades on the upstream propeller belonging to the same group;
  the upstream propeller comprises $(2k+1)n$, $k \in \mathbb{N}$, blades, and at least one counterweight positioned diametrically opposite to a first blade;
  the number n of groups of blades is two or three;
  the downstream propeller comprises a plurality of blades having the length of the first blade;
  said second blade is a truncated first blade;
  said second blade is shorter than the first blade by 0.5% to 5%;
  the propellers are contra-rotating;
  the downstream propeller is fixed.

PRESENTATION OF THE FIGURES

Other features and advantages of the first invention will appear upon reading the description that follows of a preferred embodiment. This description will be given with reference to the appended drawings wherein:

FIG. 1, previously described, shows an example of a contra-rotating open rotor;

DETAILED DESCRIPTION

Open Rotor

Figure 1:
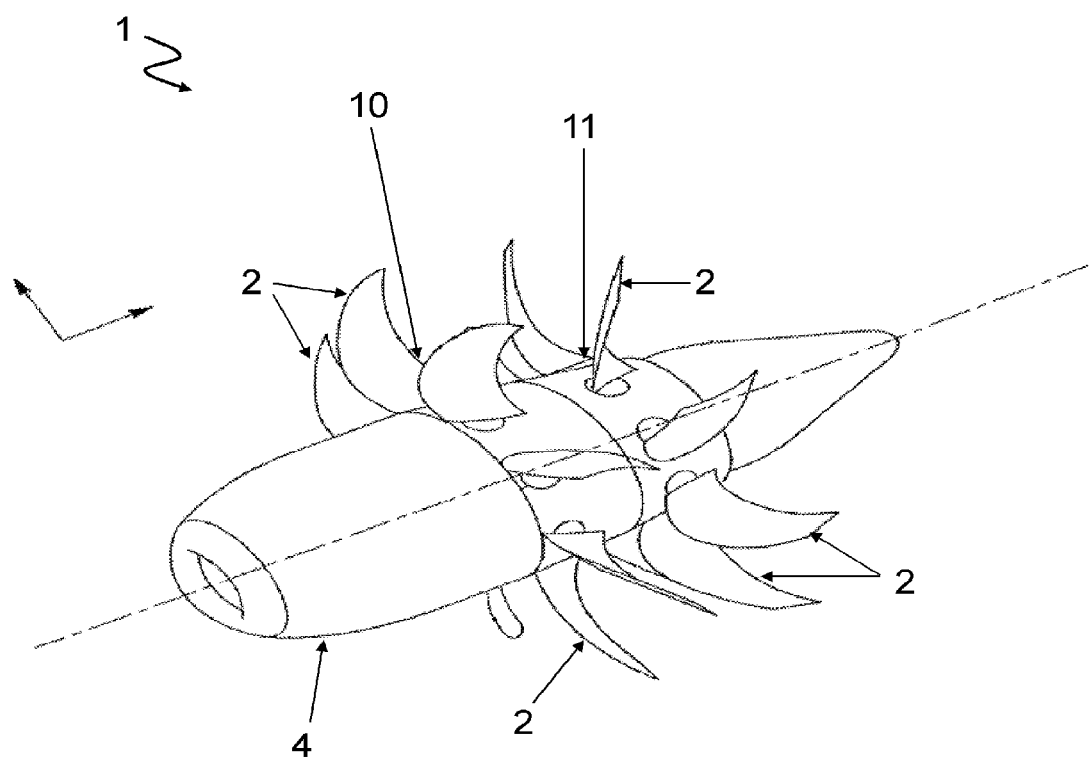

Referring to FIG. 1, a turbomachine 1 is proposed comprising at least two unducted propellers 10, 11 including one upstream propeller 10 and one downstream propeller 11 (in the direction of flow of the fluid). It will be understood that other propellers can be positioned downstream of the first ones.

This turbomachine 1 is preferably of the "open rotor" type (CROR) and also comprises a gas generator 4 (i.e. the "core" of the turbomachine, carrying out in particular the combustion of the fuel), central with respect to the axis of flow of the gases (in a casing), comprising a turbine driving in rotation the propellers 10, 11, which in this example are contra-rotating (i.e. the upstream propeller 10 has a direction of rotation opposite to that of the downstream propeller 11). The turbomachine can just as well be an open rotor "pusher" (the propellers 10, 11 are downstream of the gas generator 4, and "push" the turbomachine 1) as an open rotor "puller" (the propellers 10, 11 are upstream of the gas generator 4 and "pull" on the turbomachine 1).

It will also be noted that the propellers 10, 11 are not necessarily contra-rotating and that the second propeller 11 can in addition be a stator (i.e. a fixed propeller), the turbomachine 1 then being of the type called USF ("Unducted Single Fan").

In any case, each propeller 10, 11 has a plurality of blades 2 extending substantially radially from the central casing. The propellers 10, 11 define around the casing an unducted fan of the turbomachine 1.

Configuration of the Blades

Figure 2A:
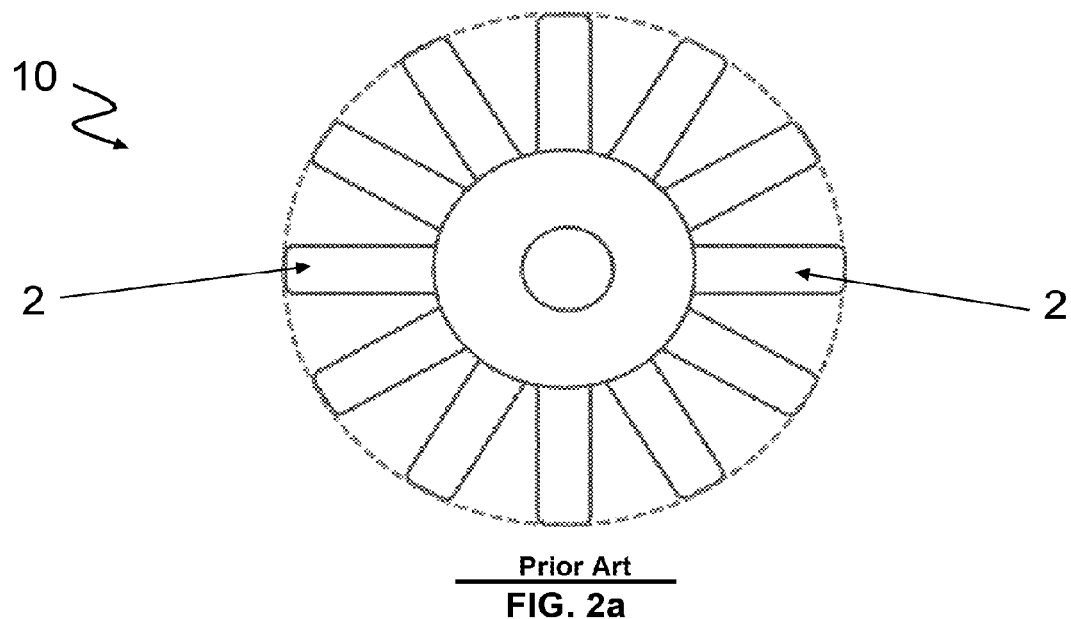
FIG. 2a shows an unducted upstream propeller of a known turbomachine.

In known fashion, see FIG. 2a, the blades 2 of the propellers 10, 11 are of the same length. In other words, the "radius" (i.e. the distance to the axis of rotation of the propeller 10, 11) from the tip of all the blades is constant. Hereafter in the present description, the term "length" of the blade will be employed for convenience, but it will be understood that by length of a blade 2 is meant the radius at its tip, i.e. the distance between the axis of rotation of the propeller 10, 11 bearing the blade 2 (generally the axis of rotation of the propellers 10, 11 because it is common) and the tip of the blade 2.

The present turbomachine is distinguished in that, in contrast, at least one first blade 2a of the upstream propeller 10 has a different length from at least one second blade 2b, 2c of the upstream propeller 10 (in other words, the upstream propeller comprises at least two blades 2a, 2b, 2c with different lengths). By convention, the first blade 2a is selected longer than the second blade 2b, 2c, it will be seen below that there can be several lengths of the second blade 2b, 2c.

This makes it possible for the vortex structures emitted by the blades 2a, 2b, 2c of the upstream propeller 10 to strike the blades 2 of the downstream propeller 11 at different radial positions.

In fact, each blade tip vortex emitted follows the streamline passing through the blade tip fairing (i.e. the tip) of the blade 2a, 2b, 2c of the upstream propeller. This streamline is constrained by the contraction of the flow due to the suction of the propellers.

Figure 3:
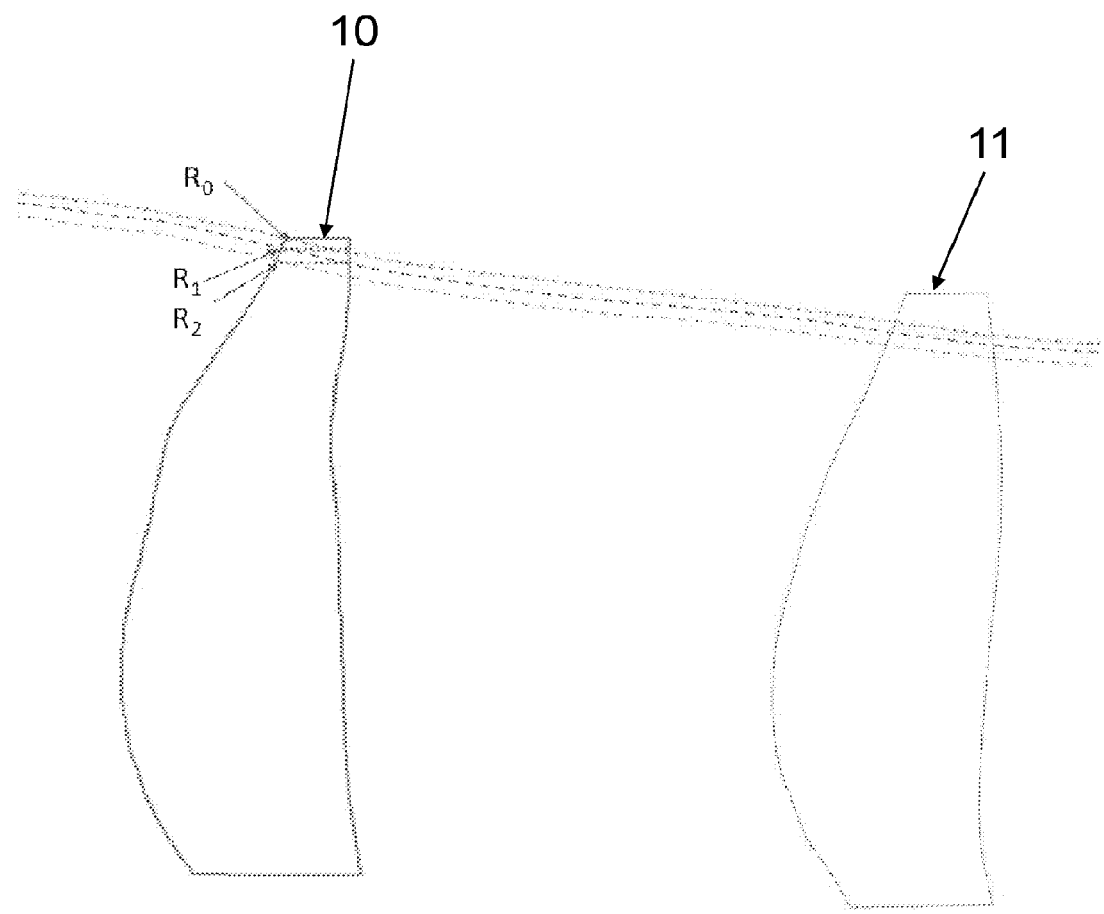
FIG. 3 illustrates the displacement of the streamlines observed in an embodiment of a turbomachine according to the invention.

Consequently, if a second blade 2b, 2c of the upstream propeller 10 has a reduced length, the streamline passing by its blade tip fairing has a smaller radius than that of a first blade 2a of greater length. Thus, as shown by FIG. 3, the vortex caused by a second blade 2b, 2c strikes the downstream propeller 11 lower than that caused by a first blade 2a. In this fashion, the vortices of the upstream propeller 10 associated with the different blades 2a, 2b, 2c strike the same blade 2 of the downstream propeller 11 at different radial positions (whereas the impacts were all at the same place for an upstream propeller 10 with uniform blade lengths), thus allowing de-phasing of the acoustic sources, leading to a reduction of the radiated acoustic level.

This configuration applies in the case where the vortices of the upstream propeller 10 strike the downstream propeller 11 (entirely or partially), that is the downstream 11 is either not clipped, or is insufficiently clipped. In a preferred embodiment, all the blades 2 of the downstream propellers 11 have the same length, and in particular the length of the first blade 2a of the upstream propeller 10.

Preferably, a second blade 2b, 2c is simply a shortened first blade 2a. In other words, the design of the blade is not modified; only the end is truncated.

This modification must not be too great so as not to modify the aerodynamic performance of propellers 10, 11, but must be done sufficiently to de-phase the acoustic sources. Advantageously, said second blade 2b, 2c (in particular the shorter of the second blades 2b, 2c if there are several lengths) is shorter than the first blade 2a by 0.5% to 5%.

An asymmetrical steady-state calculation has in fact made it possible to determine that a reduction in the radius of a second blade 2b, 2c (with respect to a first blade 2a) of the upstream propeller 10 by 0.8% (with constant blade pitch) incurs, at cruise altitude, a loss of thrust of 0.3% on this blade 2b, 2c and a negligible loss on a blade 2 of the downstream propeller 11. The efficiency of one blade of the upstream propeller 10 thus drops 0.02 points, and that of a blade of the downstream propeller 0.05 points, which is acceptable.

The same calculation for takeoff gives a loss of 1.3% for thrust on this blade 2b, 2c and a negligible loss for a blade 2 of the downstream propeller 11. The efficiency of a blade of the upstream propeller 10 thus drops 0.15%, and that of a blade of the downstream propeller 11 is not affected.

If the losses of thrust are too great, it is possible to select a common pitch for all the blades (of the same propeller: downstream, upstream or both) allowing the thrust to be recovered.

One additional consequence of the variation of the lengths of the blades 2b, 2c of the upstream propeller 10 is the modification of the azimuthal propagation speeds of the vortices in the inter-blade flow. In fact, the peripheral speed $U_i$ of the tip of a second blade 2b, 2c is reduced proportionally to the reduction of the radius ($U_i = \Omega R_i$, where $\Omega$ is the speed of rotation of the upstream propeller 10 and $R_i$ the radius of the second blade 2b, 2c). This modification of speed brings about a temporal de-phasing of the acoustic sources in addition to the spatial de-phasing.

The azimuthal speed of the marginal vortex escaping from the tip of the second blade 2b, 2c is therefore reduced as well. For a sufficient length variation between the first and second blades 2a, 2b, 2c, the propagation in azimuth of the vortices between the propellers 10, 11, and therefore the interaction with the downstream propeller 11, is no longer axisymmetrical. Likewise, this modification produces a temporal de-phasing of the acoustic sources.

In addition to introducing an additional de-phasing between the sources, there results a modification of the periodicity of the interactions, and therefore of their frequencies in the audible spectrum. Assuming that acoustic energy is conserved, the noise levels can be reduced locally (in frequency) and the linewidth (i.e. frequency peak in the acoustic spectrum) can spread, or even split into different interaction lines at lower frequencies.

Groups of Blades

According to advantageous embodiments, the first and second blades 2a, 2b, 2c are organized according to certain pre-determined patterns. In particular, it is desirable that two consecutive blades 2a, 2b, 2c of the upstream propeller 10 have different lengths, i.e. that the first blades 2a, are separated by second blades 2b, 2c.

To this end, the blades 2a, 2b, 2c of the upstream propeller 10 are advantageously divided into n≥2 groups of blades of equal length, including at least one group of first blades 2a and at least one group of second blades 2b, 2c. All the groups of blades 2a, 2b, 2c have different blade 2a, 2b, 2c lengths. For convenience, it is possible to consider that the first group includes all the longest blades (the first blades 2a) and that the n−1 other groups are groups of second blades 2b, 2c sorted by decreasing lengths: the second group includes all the longest of the second blades, the nth group includes the shortest of the second blades, etc.

Figure 2B:
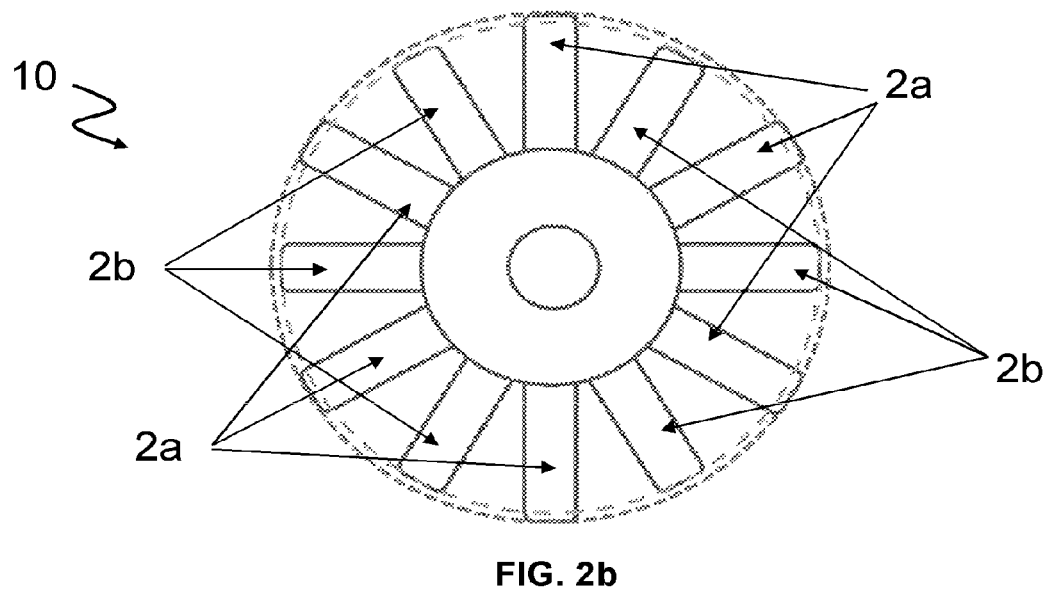
FIGS. 2b and 2c show two embodiments of an upstream propeller of a turbomachine according to the invention.

This number n of groups of blades 2a, 2b, 2c is preferably two (the case of FIG. 2b) or three (the case of FIG. 2c, wherein there are two second blade lengths: the blades 2b form one group of second blades of "medium" length and the blades of 2c one group of second blades of "short" length), but it can be greater. It will be noted that in the case of at least three groups, the length of the blades associated with each of the groups are selected to be regularly distributed between that of the nominal length (that of the first blade 2a) and that of the shortest second blade 2b, 2c (the length whereof is advantageously between 98.5% and 99.5% of that of the first blade 2a).

Denoting these lengths as $L_{min}$ and $L_{max}$, we have for example $$L_{i \in [\![1;n]\!]} = L_{min} + i \times \frac{L_{max} - L_{min}}{n},$$

where $L_i$ is the length of the blades of the ith group.

Figure 2C:
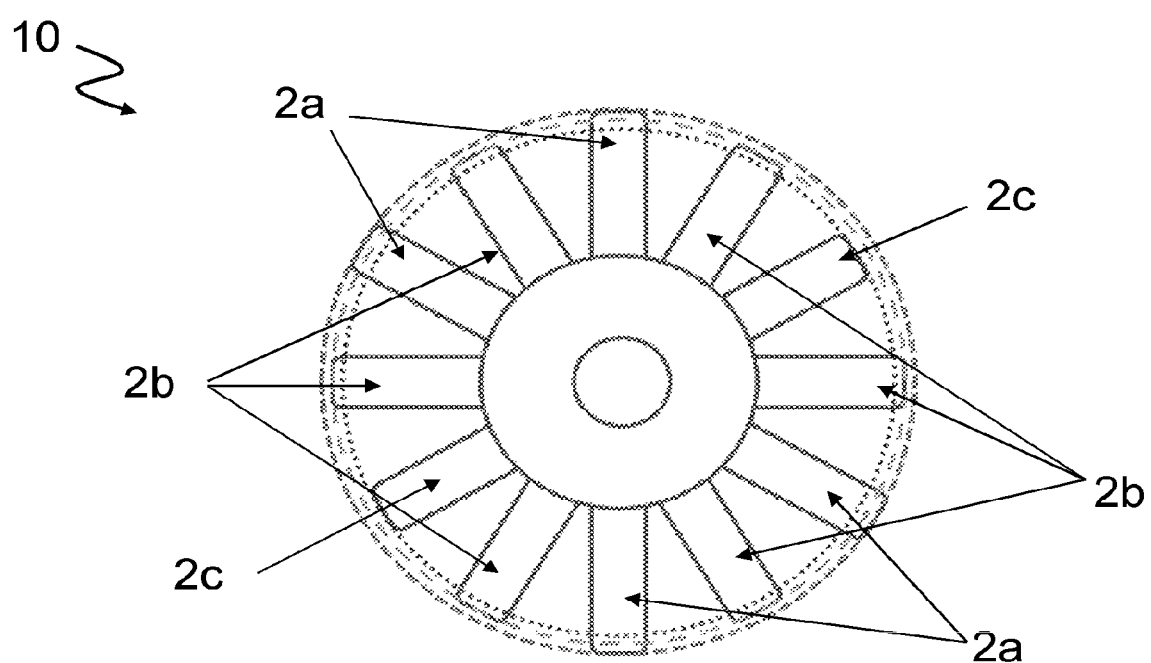

All the groups of blades 2a, 2b, 2c can comprise an equal number of blades 2a, 2b, 2c (as is the case with FIG. 2b, wherein there are two groups of six blades 2a, 2b, 2c), or different numbers of blades (as is the case with FIG. 2c, wherein there are three groups, including one group of four first blades 2a, one group of six second blades 2b and one group of two second blades 2c). This can allow that two adjoining blades 2a, 2b, 2c are always of one group j and one group j+1, j∈⟦1; n−1⟧, i.e. that there is always a difference in length, but a minimal difference, between two adjoining blades.

The distribution of groups of blades 2a, 2b, 2c can also be the object of different variants, preferably taking the form of a pattern repeating itself for each m∈⟦n; +∞[ consecutive blade.

In an optimal mode, the blades 2a, 2b, 2c are positioned around the upstream propeller 10 so that each sub-assembly of n consecutive blades 2a, 2b, 2c (i.e. sequences of n blades) comprises one blade 2a, 2b, 2c from each group, in other words that the upstream propeller 10 conforms to a pattern with an order equal to the number n of groups (i.e. the pattern repeats every n blades, in other words m=n). For example, the sequence of blades 2a, 2b, 2c can conform to the pattern 1, 2, . . . , n, 1, 2, . . . , n, 1, 2, . . . , n, etc. That is the case for FIG. 2b: the sequence of blades is 2a, 2b, 2a, 2b, etc.

It is noted that if n>2, there potentially exists a considerable discontinuity of length between the blades numbered n (the shortest) and f (the longest), which is why more complex patterns (but always following a pattern of order n (for example, if n=5: 1, 3, 5, 4, 2) are possible.

Balancing

Preferably, the upstream propeller 10 is configured so as to avoid any imbalance. In the simplest case, the upstream propeller 10 comprises 2kn, k∈ℕ*, blades 2a, 2b, 2c, where n is still the number of groups, each comprising an even number (2k) of blades (there is then necessarily an even number of blades no matter the parity of n).

Two diametrically opposed blades 2a, 2b, 2c are then selected on the upstream propeller 10 so as to belong to the same group (hence the absence of imbalance despite the varied lengths of the blades 2a, 2b, 2c).

It should be noted that, if these 2kn blades are organized in sequences of n blades comprising one blade 2a, 2b, 2c from each group, (in other words, the particular case wherein the number of sequences is even), then the number of sequences is 2k, and two diametrically opposed blades 2a, 2b, 2c belong automatically to the same group (and balancing is consequently achieved).

It will be noted that the propeller 10 conforming to FIG. 2c observes this distribution principle, which makes it possible to avoid the use of any counterweight.

If the upstream propeller 10 comprises (2k+1)n, k∈ℕ, blades 2a, 2b, 2c, where n is still the number of groups, each comprising an odd number (2k+1) of blades (this including the particular case of a provision of 2k+1 sequences of n blades), the preferred configuration depends on the parity of n, but at least one counterweight positioned diametrically opposite to the first blade 2a becomes necessary.

If n is even, the total number of blades 2a, 2b, 2c remains even, which means that each blade has a diametrically opposed blade, but it is impossible to ensure that two diametrically opposed blades 2a, 2b, 2c always belong to the same group. In other words, there necessarily exist at least one pair of diametrically opposed blades comprising a first blade 2a and a second blade 2b, 2c. The latter is then equipped with a counterweight if necessary.

If n is odd, the total number of blades 2a, 2b, 2c is odd, which means that there are no diametrically opposed blades 2a, 2b, 2c, hence the use of counterweights. In this case, the counterweights will be distributed between several diametrically opposed blades.

In another embodiment, the counterweights can be located at other places in the rotor.

The invention claimed is:

1. A turbomachine comprising:
   at least two unducted propellers including one upstream propeller and one downstream propeller, the upstream propeller comprising a plurality of blades at least one first blade of the plurality of blades has a tip radius different from at least one second blade of the plurality of blades.

2. The turbomachine according to claim 1, wherein two consecutive blades of the upstream propeller have different tip radii.

3. The turbomachine according to claim 1, wherein the blades of the upstream propeller are divided into n≥2 groups of blades with equal tip radius, including at least one group of first blades and at least one group of second blades.

4. The turbomachine according to claim 3, wherein all the groups of blades have different blade tip radii.

5. The turbomachine according to claim 3, wherein all the groups of blades comprise an equal number of blades.

6. The turbomachine according to claim 5, wherein the blades are positioned around the upstream propeller so that each subassembly of n consecutive blades comprises one blade from each group.

7. The turbomachine according to claim 3, wherein the upstream propeller comprises 2kn,k∈ℕ*, blades, two diametrically opposed blades on the upstream propeller belonging to the same group.

8. The turbomachine according to claim 3, wherein the upstream propeller comprises (2k+1)n, k∈ℕ, blades, the turbomachine comprising at least one counterweight positioned diametrically opposite to a first blade.

9. The turbomachine according to claim 3, wherein the number n of groups of blades is two or three.

10. The turbomachine according to claim 1, wherein said second blade is a truncated first blade.

11. The turbomachine according to claim 1, wherein said second blade is shorter than the first blade by 0.5% to 5%.

12. The turbomachine according to claim 1, wherein the downstream propeller comprises a plurality of blades having the tip radius of the first blade.

13. The turbomachine according to claim 1, wherein the propellers are contra-rotating.

14. The turbomachine according to claim 1, wherein all blades of the downstream propeller have a same tip radius.

15. A turbomachine comprising:
an upstream propeller and a downstream fixed stator, the upstream propeller comprising a plurality of blades at least one first blade of the plurality of blades has a tip radius different from at least one second blade of the plurality of blades.

16. The turbomachine according to claim 15, wherein all blades of the downstream fixed stator have a same tip radius.

* * * * *